July 31, 1923.
W. J. BEISEL
SPRING WHEEL
Filed Dec. 7, 1921
1,463,192
2 Sheets-Sheet 1
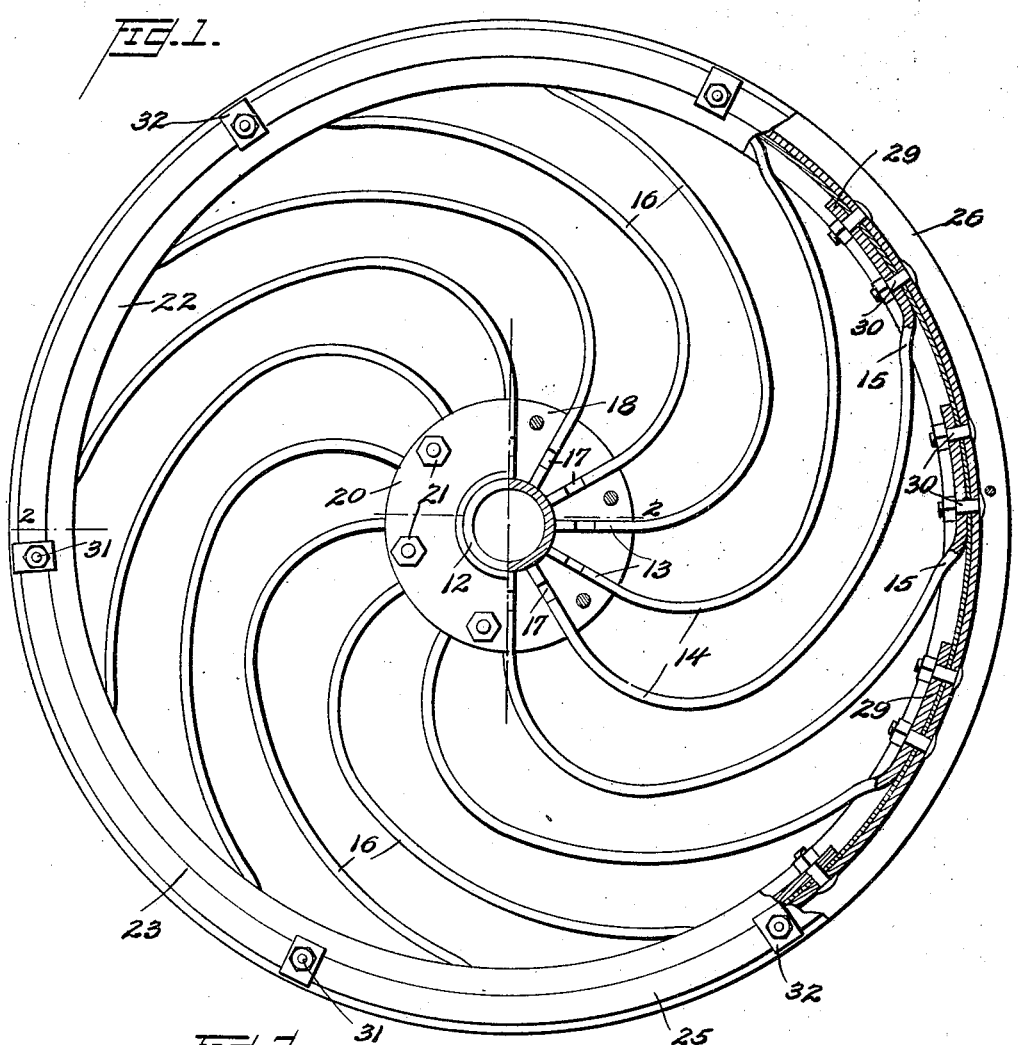
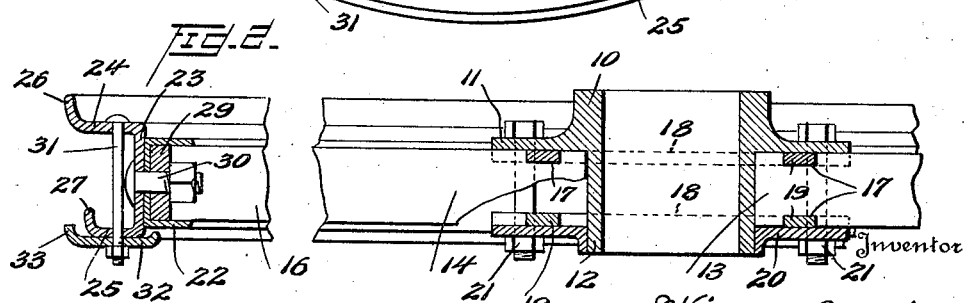
William J. Beisel,
By Watson, Coit, Morse & Grindle,
Attorneys.

July 31, 1923. 1,463,192
W. J. BEISEL
SPRING WHEEL
Filed Dec. 7, 1921  2 Sheets-Sheet 2
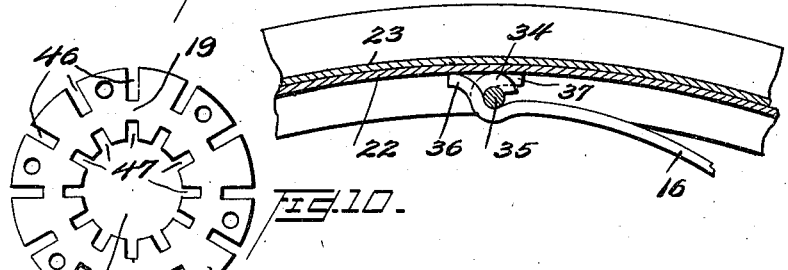
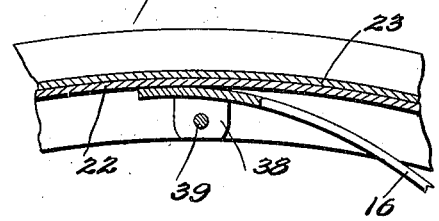
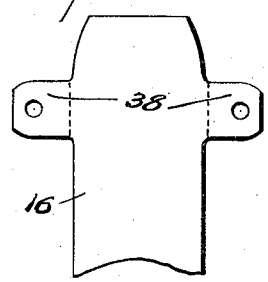
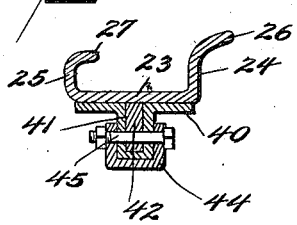
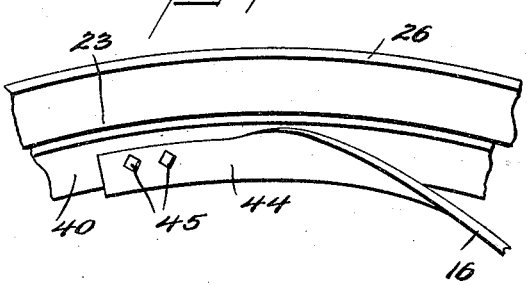
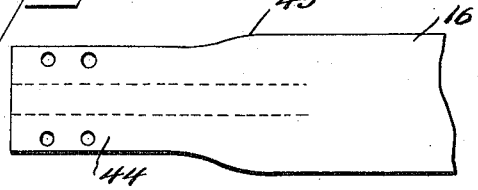
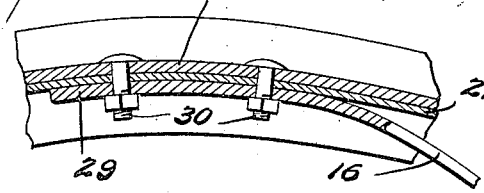
Inventor
William J. Beisel,
By Watson, Coit, Morse & Grindle,
Attorneys.

Patented July 31, 1923.

1,463,192

UNITED STATES PATENT OFFICE.

WILLIAM JAKOB BEISEL, OF PORT RICHMOND, NEW YORK.

SPRING WHEEL.

Application filed December 7, 1921. Serial No. 520,578.

*To all whom it may concern:*

Be it known that I, WILLIAM J. BEISEL, a citizen of the United States, and residing at Port Richmond, county of Richmond, State of New York, have invented certain new and useful Improvements in Spring Wheels, of which the following is a specification.

This invention relates to spring wheels of that type particularly adapted for use on motor vehicles. It embodies a novel and useful combination including novel features of the hub structure disclosed and specifically claimed in my copending application Ser. No. 487,615, filed July 26, 1921, and novel features of a rim structure adapted to receive a demountable tire rim described and claimed in another pending application filed by me together with a series of spring spokes of novel longitudinal form and arrangement giving the desired yielding and resilient effect to the wheel in supporting the load when moving over uneven surfaces. Its novel features will be more fully understood from the following description and claims taken with the accompanying drawings.

In the drawings:

Fig. 1 is a side view of a wheel embodying the invention, the rim structure being shown partly in section and a portion of the hub cap being shown removed.

Fig. 2 is a partial section on the line 2—2 of Figure 1;

Fig. 3 is a detail section through a part of the rim showing a different form of means for securing the ends of the spokes to the rim;

Fig. 4 is a similar view of another form which may be used;

Fig. 5 is a plan view of the end of the spoke in blank form shown in combination in Figure 4;

Fig. 6 is a cross section showing another form of inner rim and a modification of the outer ends of the spokes to match the rim;

Fig. 7 is a side view of a portion of the wheel rim showing the modified structure of Figure 6;

Fig. 8 is a plan view of the blank form of the end of a spoke used in the modification shown in Figure 6.

Fig. 9 is a detail section of the rim showing the end of a spoke of modified form; and Fig. 10 is a side view of a hub disk.

As shown in Figures 1 and 2 of the drawings, the hub 10 has an integral radial flange 11 near one end and the other end 12 up to that flange is cylindrical. The spokes are made of flat spring metal of uniform width and of substantially uniform thickness and are all alike and symmetrically arranged whatever number is used. Their inner ends 13 are straight and radial entering the hub structure but have a curve 14 transversely of the radial portion near the hub and said curve is on the arc of a circle having a radius approximately one-third as long as the radius of the inner surface of the rim of the wheel and continues throughout something more than 90° and the spoke then continues on a curve 16 in the same general direction but having a radius somewhat less than three times as great as that of the first mentioned curve and this last mentioned curve continues almost to a radial plane 90° removed from the radial inner end of the spoke and is there at 15 Figure 1 bent or offset outwardly a short distance and continues from that point on to the end on such circular arc as will cause it to closely fit the inner surface of a wheel rim hereinafter described. To make clear the relative arrangement of the parts of a spoke a specific illustration will be given but with the understanding that it does not in any way limit the scope of the invention beyond what is called for in the claims. Assuming a spoke to be $1\frac{1}{4}$ inches wide and $\frac{1}{4}$ inch thick the center of the circle for the first curve will be in a parallel plane $3\frac{1}{2}$ inches from the plane of the facing side of the inner end of the spoke and in a plane at right angles to the inner end $2\frac{1}{2}$ inches outward along the spoke from the extreme inner end which abuts the hub and its radius will be $3\frac{1}{2}$ inches. The succeeding curved portion on a longer radius will have its center in a plane $2\frac{1}{4}$ inches outward on the same side from and parallel to the plane of the facing side of the inner end of the spoke and in a plane at right angles to the plane of the inner end of the spoke $3\frac{5}{16}$ inches beyond or on the other side of the hub from the extreme inner end of the spoke and its radius will be $9\frac{1}{2}$ inches. Although the curvature of the part beyond the offset 15 is such as to adapt it to fit the inner surface of the rim, it may when made and before applying the rim to it project outward somewhat beyond with its extreme end extending outward the greatest distance so that it will be under some tension pressing outward when the wheel is assembled. It has been found that this longitudinal curvature to the spring gives especially good results in resiliency and lasting qualities and also gives all of the requisite strength.

Referring now to the hub structure the inner radial ends 13 of the spokes have rectangular side notches 17. A pair of circular disks 18 having central openings 48 fitting the cylindrical portion 12 of the hub have aligned radial slots 46 and 47 in their outer and inner edges corresponding in width to the thickness of the spokes with a solid portion 19 between the ends of the slots of such size as to fit in the rectangular notches 17 of the spokes with the adjacent edges of the spokes resting in the radial slots. A flange or circular disk 20 slides over the end of cylindrical portion 12 and fits the sides of the spokes and one of the disks 18 while the other sides of the spokes and the other disk 18 fit integral flange 11. Bolts with nuts 21 pass through the flanges and disk between spokes and secure them together on the hub. This hub structure is like that in my application Ser. No. 487,615 and permits detaching the wheel from the hub.

The preferred form of rim structure and cooperating end structure of the spokes are shown in Figures 1 and 2. The inner rim 22 is channel shaped facing inward and is continuous. An outer channel shaped rim 23 facing outwardly and slightly wider than rim 22 fits the outer surface of rim 22 and has its inner flange 24 of greater height than its outer flange 25 and its outer edge is transversely curved outwardly as shown at 26. The outer edge 27 of flange 25 is transversely curved similarly to the outer edge 26. The outer ends 29 of the spokes beyond offset 15 closely fit the inner surface of the base of the channel rim 22 between its side flanges and the side flanges furnish lateral supports for the ends of the spokes. Bolts 30 or other suitable fastening means pass through the end portions 29 of the spokes, the base of channel rim 22 and the base of channel rim 23 and securely hold them together. Bolts 31 having screw threaded nuts pass through the side flanges 24 and 25 of channel rim 23 and also through retaining clips 32 which have a depending portion adapted to fit the outer and under side of flange 25 and an upper inwardly curved portion 33 above the outer edge of flange 25. The flange 25 being lower than flange 24, a demountable rim carrying a tire may, when clips 32 are turned out of the way on bolts 31 pass over that flange and make contact with the curved portion 26 of flange 24. The clips 32 may then be turned back to operative position and bolts 31 tightened to securely hold the detachable rim and tire in position.

Although the means shown in Figures 1 and 2 constitute the preferred form of connection between the ends of the spokes and the channel rim, other means may be used in combination with the two channel rims the outer of which serves to receive a detachable rim. In Figure 3 for instance is shown a form of connection where a part of the end of the outer portion 16 of the spoke is curled transversely in cylindrical form 34 surrounding a bolt 35 passing through the side flanges of the inner channel rim 22 thus securing the spoke to the rim. In this case projecting portions 36 and 37 make contact with the inner surface of the base of channel rim 22 so as to prevent rattling. In Figures 4 and 5 another form is shown where the end of portion 16 of the spoke is provided with perforated side ears 38 which are bent at right angles and a bolt 39 passes through them and through the side flanges of inner channel rim 22 the projecting end of the spoke bearing against the inner face of the base of the channel.

In Figures 6, 7 and 8 I have shown a modified form of inner channel bar rim and a modified form of spoke end to fit it and have also shown an added element in the form of a continuous ring interposed between the two channel bar rims. In this instance the inner rim 40 has a narrow channel 41 facing outwardly and laterally extending portions in the form of a cylinder with the center of the hub as its axis lying flat against the inner surface of the outer channel rim 23. The outer channel rim 23 and its means for receiving and retaining a detachable rim are the same as heretofore described and shown in Figures 1 and 2. A solid continuous ring 42 fills the channel in rim 40. In this instance the side portions of the spoke are cut away at the end from the point 43 in Figure 8 and the projecting narrow portion 44 is bent transversely on longitudinal lines to right angles and fits over the inward projection formed by the narrow channel 41 of rim 40. This lateral bending of the narrow portion of the spoke extends somewhat beyond the point 43 but the wider portions of the spoke are gradually bent outward lessening the central longitudinal depression and bringing all parts of the spoke into transverse alignment or into the same transverse plane near the rim. Bolts 45 pass through the lapping sides of portion 44 the walls of channel 41 and ring 42 thereby rigidly securing the ends of the spokes to the inner rim and ring 42. It will be noted that in this form as well as that of Figures 1 and 2 the outer ends of the spokes closely fit the inner portions of the inner channel bar rim and are rigidly bolted to it.

The structure of the rim and ends of the spokes and the means for securing them together shown in Figure 9 are identical with what is shown in Figure 1 except that the outward bend or offset 15 in the spoke is omitted and the spoke approaches the rim on a gradual curve.

Although a wheel having twelve spokes each composed of a single strip of metal is shown for illustration, the invention is not limited as to the number of spokes or the number of layers of which they are composed and is not limited to any of the details shown beyond what is indicated in the claims.

Having thus described the invention what is claimed as new and desired to be secured by Letters Patent is:

1. A spring wheel comprising in combination a hub, a continuous rim and a series of flat metal spring spokes constituting the sole means connecting and preserving the relations of said hub and rim having radial inner end portions secured in the hub, and laterally curved near the hub on the arc of a circle for approximately 90° and beyond that point similarly curved on the arc of a circle of materially greater diameter and having outer end portions fitting longitudinally and secured to the rim, the said curved portion of each spoke being on one side of the radial plane of its inner end and extending in the same direction peripherally of the wheel.

2. A spring wheel comprising in combination a hub, a continuous rim and a series of flat metal spring spokes constituting the sole means connecting and preserving the relations of said hub and rim having radial inner end portions secured in the hub, and laterally curved near the hub on the arc of a circle for approximately 90° and beyond that point similarly curved on the arc of a circle of materially greater diameter to a point substantially 90° removed from the plane of the inner end around a circle with the axis of the hub as its center and from that point on fitting and secured to the inner face of the rim.

3. A spring wheel comprising in combination a hub, a continuous rim and a series of flat metal spring spokes constituting the sole means connecting and preserving the relations of said hub and rim having radial inner end portions secured in the hub, and laterally curved near the hub on the arc of a circle for approximately 90° and beyond that point similarly curved on the arc of a circle of materially greater diameter to a point substantially 90° removed from the plane of the inner end around a circle with the axis of the hub as its center and from that point on offset outwardly and fitting and secured to the inner face of the rim.

4. A spring wheel comprising in combination a hub, a continuous rim and a series of flat metal spring spokes constituting the sole means connecting and preserving the relations of said hub and rim having radial inner end portions secured in the hub each spoke being curved laterally of the plane of its inner end near the hub on the arc of a circle having a radius approximately one-third as long as the radial distance from the inner end of the spoke to the rim and similarly curved beyond said first mentioned curve on the arc of a circle slightly less than the radial distance between the inner end of the spoke and the rim the outer end beyond said last mentioned curve fitting longitudinally the inner face of the rim and means rigidly securing said end to the rim.

5. A spring wheel comprising in combination a hub, a continuous rim and a series of flat metal spring spokes constituting the sole means connecting and preserving the relations of said hub and rim having radial inner end portions secured in the hub each spoke being curved laterally of the plane of its inner end near the hub on the arc of a circle having a radius approximately one-third as long as the radial distance from the inner end of the spoke to the rim for 90° and similarly curved beyond said first mentioned curve on the arc of a circle slightly less than the radial distance between the inner end of the spoke and the rim to a point in a plane through the axis of the wheel at approximately right angles to the radial plane of the inner end of the spoke the outer end beyond said last mentioned curve fitting longitudinally the inner face of the rim and means rigidly securing said end to the rim.

6. A spring wheel comprising a hub having a cylindrical portion, an inwardly facing continuous channel bar rim, a series of flat metal spring spokes of substantially uniform width and thickness constituting the sole means connecting and preserving the relations of said hub and rim, having inner radial portions abutting the cylindrical portion of the hub, means for detachably securing them to the hub, each spoke being curved laterally of the radial inner end gradually with increased radius of curvature of its outer portion extending around the wheel from the plane of its inner end across a plane through the axis of the hub at right angles thereto and having an end portion from a point in advance of said plane fitting longitudinally the inner face of the channel bar rim and bolts securing said ends to said base.

7. A spring wheel comprising a hub having a cylindrical portion, an inwardly facing continuous channel bar rim, a series of flat metal spring spokes of substantially uniform width and thickness constituting the sole means connecting and preserving the relations of said hub and rim having inner radial portions abutting the cylindrical portion of the hub, means for detachably securing them to the hub, each spoke being curved laterally of the radial inner end gradually with increased radius of curvature of its outer portion extending around the wheel from the plane of its inner end across a plane through the axis of the hub at right angles thereto and having end portions from a point in advance of said plane offset outwardly fitting in said channel bar rim between its side flanges, an outwardly facing channel bar rim surrounding said inwardly facing rim with the inner face of its base portion closely fitting the outer face of the inwardly facing rim and bolts passing through and securing together said channel bar rims and the ends of the spokes.

In testimony whereof I hereunto affix my signature.

WILLIAM JAKOB BEISEL.